F. PLESS.
Potato-Diggers.
No. 146,705. Patented Jan. 20, 1874.
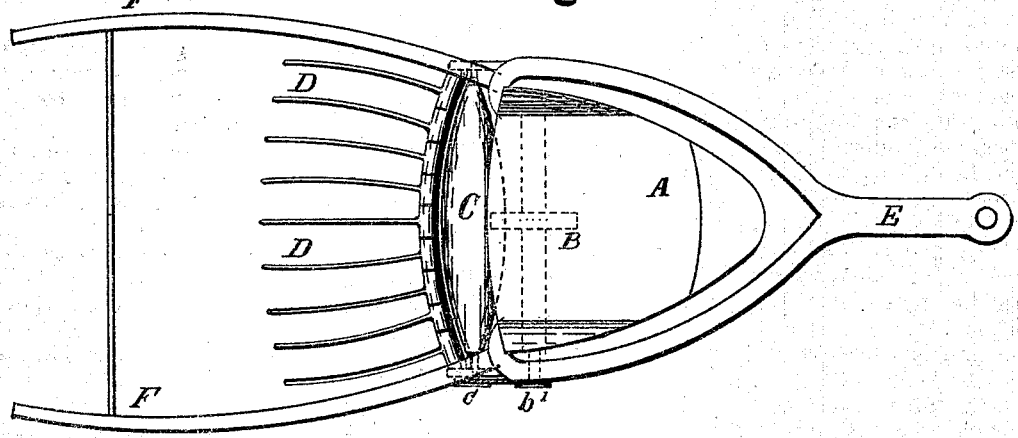

UNITED STATES PATENT OFFICE.

FRIEDRICH PLESS, OF MARILLA, NEW YORK.

IMPROVEMENT IN POTATO-DIGGERS.

Specification forming part of Letters Patent No. 146,705, dated January 20, 1874; application filed August 25, 1873.

*To all whom it may concern:*

Be it known that I, FRIEDRICH PLESS, of Marilla, in the county of Erie and State of New York, have invented certain new and useful Improvements in Potato-Diggers; and I do hereby declare the following to be a full, clear, and exact description of the same, reference being had to the accompanying drawing making a part of this specification, in which—

Figure I is a side elevation of my improved machine. Fig. II is a plan view thereof.

The object of my invention is to construct a machine by which potatoes can be dug and properly separated from the dirt adhering to them and be deposited upon the surface of the ground as the machine is drawn along; and it consists in the combination of a shovel-plow, a wheel for giving motion, by means of a cross-belt and connecting-pulleys, to a curved or conically-shaped roller, formed to fit the curved edge of the upper part of the said plow, so that its outer surface will move closely and freely past it while operating; and a series of divergingly-arranged and independently-acting trailing-teeth, hinged upon a curved bar or rod, the said rod being of such a shape as to nearly conform to the curved surface of said roller, thereby allowing the teeth to be hinged nearly close to it. The object of the conical roller, and of arranging the trailing-teeth so as to diverge from each other, is to afford a more perfect and effectual means for separating the potatoes from the dirt after being raised from the ground by the action of the plow. In practice, I have found the teeth, when so arranged, to act with far better effect than when placed parallel to each other.

Like letters of reference designate like parts in each of the figures.

A is the plow by which the potatoes are dug from the ground. B is a guide-wheel properly adjusted on a shaft, $b$, upon one end of which a pulley, $b'$, is secured. Motion is transmitted from this pulley to the roller C by a crossed belt or chain, $c'$, running on a pulley, $c$, on the roller-shaft. D D are a series of independently-hinged trailing teeth or wires, by the vibrations of which the dirt and potatoes passing over them are properly separated, the potatoes being deposited upon the surface of the ground. E is the beam, or its equivalent, to which the horses are attached. F F are the handles by which the operator guides and directs the machine.

The relative arrangement of the parts of this machine will be readily understood upon an examination of the drawing.

The teeth D may be arranged, or a suitable device may be attached to them, so that they may be lifted from the ground, to allow the machine to be drawn backward.

I may also deem it expedient to arrange a feed-roller over the shovel-plow A, with hook-shaped teeth upon its surface, to assist in feeding the dirt back.

The potatoes are first dug from the ground by the shovel-plow A. They pass up its inclined surface onto the roller C, the rotary motion of which assists in feeding them onto the disintegrating-teeth, by which they are properly separated from the dirt, which necessarily is dug up with them.

What I claim as my invention, and desire to secure by Letters Patent, is—

The combination of the shovel-plow A, roller B, belt $c'$, pulleys $b$ and $c$, with the conically-formed roller C and the independently-hinged trailing divergent teeth D D, all constructed and arranged for joint operation, substantially as and for the purposes herein described.

FRIEDRICH PLESS.

Witnesses:
JAMES SANGSTER,
VICTOR H. BECKER.